United States Patent [19]
Diggs

[11] 3,964,465
[45] June 22, 1976

[54] HEATER AND VAPOR GENERATOR

[76] Inventor: Richard E. Diggs, 12A Road, Carthage, Mo. 64836

[22] Filed: May 7, 1975

[21] Appl. No.: 575,231

[52] U.S. Cl. .......................... 126/350 B; 126/59.5
[51] Int. Cl.² ........................................... F24H 1/34
[58] Field of Search ............... 47/2; 126/59.5, 350; 431/214, 330

[56] References Cited
UNITED STATES PATENTS

| | | | |
|---|---|---|---|
| 1,604,638 | 10/1926 | Ferguson | 431/214 |
| 2,448,656 | 9/1948 | Breese | 126/59.5 |
| 3,279,454 | 10/1966 | Henson et al. | 126/59.5 |
| 3,451,387 | 6/1969 | Hill | 126/59.5 |
| 3,796,209 | 3/1974 | Luft | 126/59.5 |

Primary Examiner—Kenneth W. Sprague
Assistant Examiner—Larry I. Schwartz
Attorney, Agent, or Firm—Shoemaker and Mattare, Ltd.

[57] ABSTRACT

A heater for warming crops such as groves of fruit trees or vineyards or other crops susceptible to freeze and frost damage, includes a burner housing having inclined side walls for directing radiant heat generally outwardly toward the crops and a burner having fuel and air outlet orifices arranged to produce efficient and substantially pollution free combustion of fuel within the housing. A vapor generator may also be supported on the housing to reflect heat toward the crops, and water in the vapor generator is heated to produce a vapor barrier or blanket of fog which provides a thermal inversion layer to aid in maintaining the heat near the ground.

8 Claims, 7 Drawing Figures

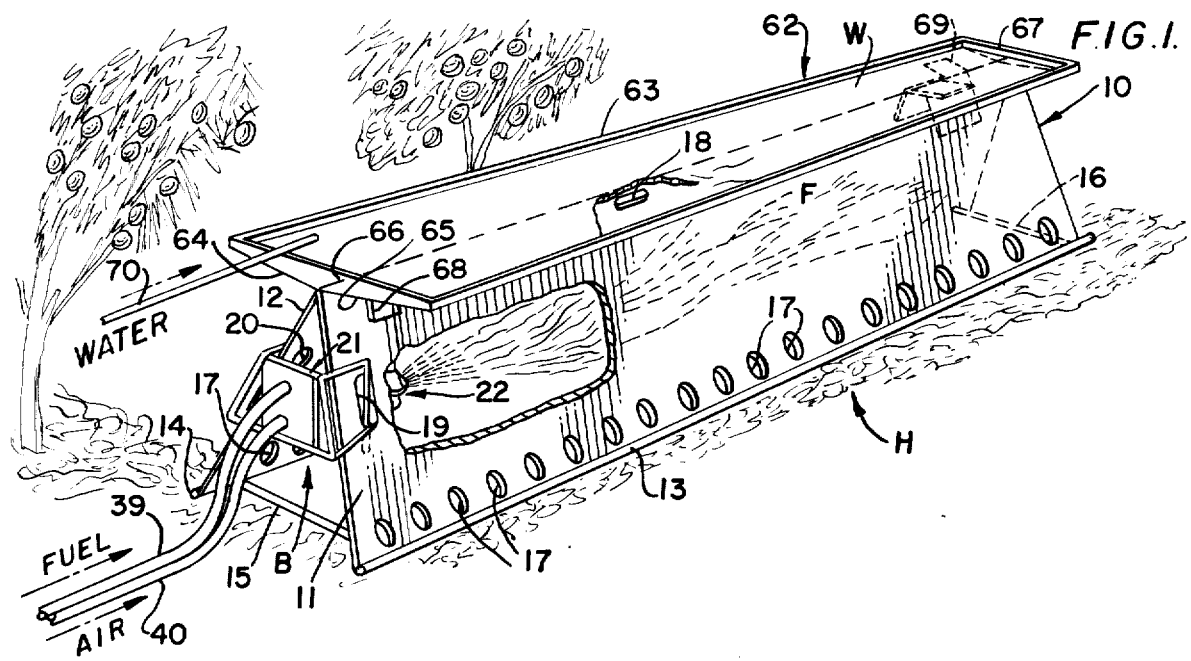
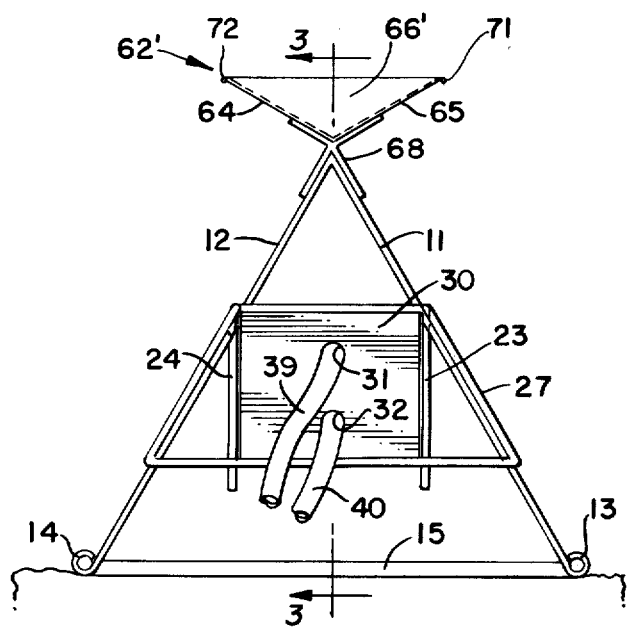
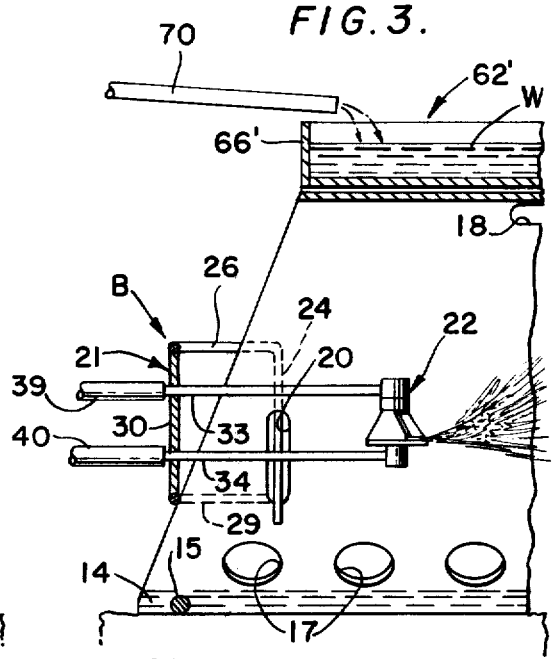
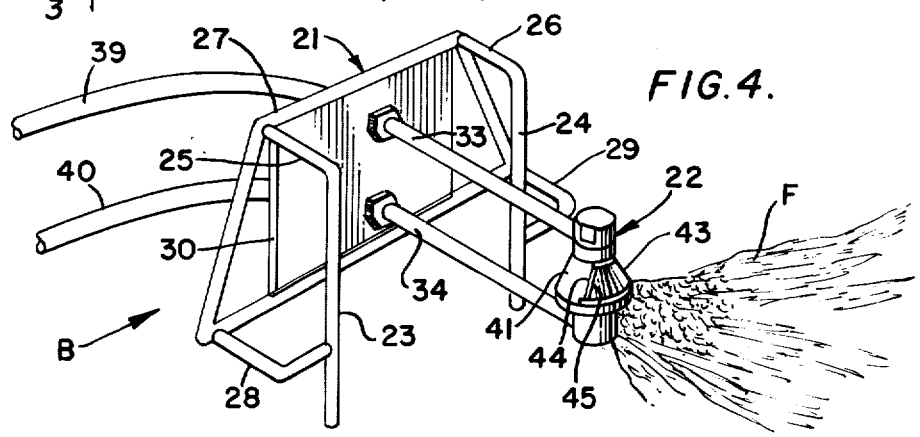

HEATER AND VAPOR GENERATOR

BACKGROUND OF THE INVENTION

This invention relates to heaters for use in orchards, groves, vineyards and the like to produce heat to prevent freezing and frost damage to fruit trees, grapevines and other crops.

Many types of heaters are in use in the prior art for producing heat to prevent damage to crops during cold weather, and most of such systems utilize some type of burner. For example, some prior art constructions utilize burners which burn fuel to produce a heavy, dense cloud or blanket of smoke which produces a thermal inversion to hold warmer air near the ground adjacent the crops and thus prevent freeze damage to the crops. However, recent environmental protection laws render such devices illegal. Other prior art devices utilize other types of burners and fuels to produce large amounts of heat. However, these devices are relatively inefficient and require large amounts of fuel and are, therefore, expensive to operate. Still further, the construction of these prior art devices is such that an excessive amount of heat produced thereby radiates upwardly and is thus lost to space without effecting any substantial warming of the crops.

The present invention provides a unique burner for use in orchards, groves, vineyards and the like that is constructed so as to produce a very turbulent flame and thus obtain efficient and substantially pollution free combustion, and which also radiates a large amount of heat outwardly onto the crops. Additionally, the burner of the present invention may be provided with a vapor generator means or tray supported on top thereof, which has outwardly directed, upwardly sloping bottom surfaces to reflect outwardly the heat rising upwardly from the side walls of the burner housing. This tray may have water therein, whereby the upwardly rising heat produces a vapor or fog which acts to form a blanket or thermal inversion layer to thereby hold the heat down near the ground and prevent freeze damage to the crops.

OBJECTS OF THE INVENTION

Accordingly, it is an object of this invention to provide a heater for frost and freeze control of crops in orchards, vineyards and the like that is very low in cost and easy to manufacture and assemble.

Another object of the invention is to provide a heater for preventing damage to crops during cold weather, wherein the heater includes an efficient burner which produces substantially pollution free combustion of fuel, and which creates a turbulent flame, thereby requiring fewer heaters and using less fuel than prior art systems.

A still further object of the invention is to provide a substantially pollution free heater for frost control of crops in orchards, vineyards and the like, wherein the heater includes a burner within a housing designed to focus or radiate heat outwardly in a generally horizontal direction toward the crops.

Yet another object of the invention is to provide a substantially pollution free heater for preventing cold weather damage to crops, wherein the heater includes a plurality of easily assembled and disassembled components constructed for easy and compact storage and handling.

Yet another object of the invention is to provide a heater for preventing cold weather damage to crops, wherein the heater can be converted to use a plurality of diverse fuels, such as natural gas, propane, butane, heavy fuel oil and diesel fuel or kerosene.

BRIEF DESCRIPTION OF THE DRAWINGS

FIG. 1 is a top perspective view of a heater in accordance with the invention having a vapor generator supported thereon and positioned in a grove or orchard of fruit trees and the like.

FIG. 2 is an end view of the heater of FIG. 1, with a modified vapor generator supported thereon.

FIG. 3 is a view in section taken along line 3—3 of FIG. 2.

FIG. 4 is an enlarged, perspective view of the burner and burner support bracket of the invention.

DETAILED DESCRIPTION OF THE INVENTION

Figure 5:
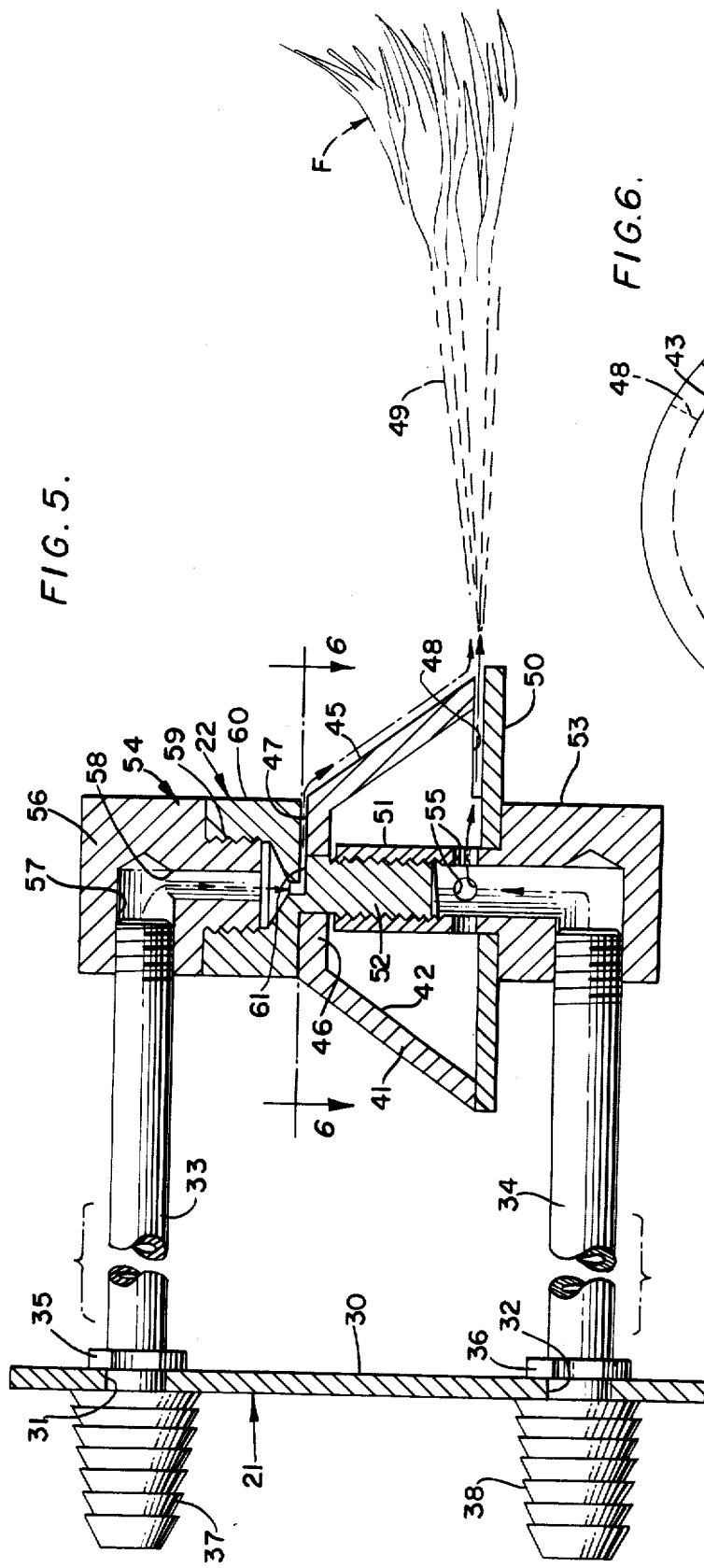
FIG. 5 is a greatly enlarged, vertical sectional view of the burner of the invention and a portion of the burner support bracket.

In the drawings, wherein like reference numerals indicate like parts throughout the several views, a heater in accordance with the invention is indicated generally at H in FIG. 1, and comprises a burner housing 10 having oppositely sloping, upwardly convergent side walls 11 and 12 joined together at their upper edges. The housing 10 is open ended and the bottom edges of the side walls 11 and 12 are rolled or otherwise suitably formed at 13 and 14 to reinforce the housing, and a pair of cross braces 15 and 16 extend between and are connected to the lower edges of the side walls adjacent the opposite ends thereof.

As seen best in FIG. 3, the ends of the side walls slope downwardly and outwardly, whereby a plurality of housings 10 may be stacked one upon the other in a minimum amount of space.

The side walls 11 and 12 have a plurality of air inlet openings 17 therethrough spaced along the bottom edges thereof to insure adequate supply of air into the combustion area defined between the side walls within the housing, and thus promote efficient and substantially pollution free combustion of fuel. The side walls 11 and 12 also have a plurality of heat outlet openings 18 therethrough adjacent the upper edges thereof for a purpose to be later described. Further, the side walls each have an elongate opening 19 and 20 therein adjacent one end thereof for readily releasably supporting a burner B on the housing.

The burner B comprises a burner support bracket 21 and a burner 22. The bracket 21 includes a rigid framework having a pair of substantially vertically extending, spaced apart legs 23 and 24, with substantially horizontally extending, parallel upper end portions 25 and 26 suitably joined, as by welding or the like, to the upper corners of a generally trapazoidal shaped framework 27. A pair of generally L-shaped frame members 28 and 29 are connected to the bottom corners of the trapezoidally shaped framework 27 and the legs 23 and 24 adjacent the lower ends thereof to rigidify and brace the legs. A substantially rectangularly shaped plate 30 is suitably secured at its top and bottom edges to the top and bottom members of the trapezoidal framework 27, as by welding or the like, and the plate 30 has a pair of vertically spaced openings 31 and 32 therethrough in which a rigid fuel supply pipe 33 and a rigid air supply pipe 34 are respectively secured by means of snap rings or lock nuts 35 and 36 and the like. The outer ends of pipes 33 and 34 are either formed with tapered, serrated fittings 37 and 38 thereon, or suitable tapered, serrated fittings of separate construction are suitably secured to the outer ends of pipes 33 and 34, such that a flexible fuel supply hose 39 may be pushed over the fitting 37 and a flexible air supply hose 40 may be pushed over the serrated fitting 38.

The burner 22 comprises a substantially frusto-conically shaped body 41 having a hollow interior 42 therein and having means such as downwardly extending, diverging upstanding ribs 43 and 44 thereon defining a flow area 45 for fuel. The body 41 also includes a substantially flat upper wall 46 having an arcuate recessed portion 47 therein defining an outlet for fuel onto the upper portion of the area 45 for flow of the fuel in a thin sheet downwardly over the area. The bottom edge of the body 41 has a recessed portion 48 therein defining an arcuate outlet slit for flow of air under pressure, which impinges against the downwardly flowing sheet of fuel to produce a fine, atomized spray of fuel under pressure, as indicated at 49, which thereby promotes thorough and complete combustion of the fuel, and produces a turbulent flame F extending over a substantial portion of the length of the housing 10. The open bottom end of the housing 10 is closed by a circular disc or plate 50 securely held against the bottom end of body 41 by means of threadably interengaged extensions 51 and 52 formed on an air inlet fitting 53 and a fuel inlet fitting 54, respectively, and extending into the hollow interior of the body 41. The air inlet fitting 53 has a hollow interior 54 and a plurality of openings 55 extend through the extension 51 to establish communication between the air supply pipe 34 and the hollow interior of body 41 and thus air outlet slit or orifice means 48. Similarly, the fuel inlet fitting 54 comprises a first body or member 56 having a pair of mutually perpendicular tapped bores 57 and 58 therein, with tapped bore 58 extending through a threaded extension 59 on body 56, which in turn is threadably engaged in an adaptor 60, on which the extension 52 is formed. An outwardly flared, tapped opening 61 extends through the adaptor 60, establishing communication from the member 56 to the fuel exit slot 47 in the upper end of body 41.

Figure 6:
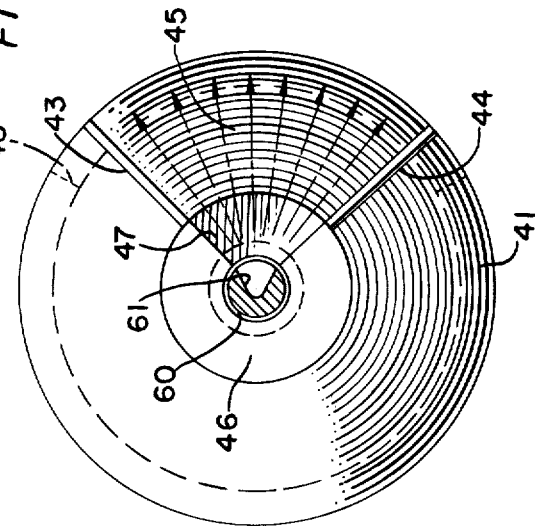
FIG. 6 is a view in section taken along line 6—6 of FIG. 5.

As seen in FIG. 6, the area 45 between ribs 43 and 44 on body 41 extends over approximately 90° of the outer surface of the body 41, and the air outlet slit 48 extends over approximately 120°.

A vapor generator and reflector means 62 is supported on top of the housing 10 and, as seen in FIG. 1, comprises a shallow tray 63 stamped from a sheet of sheet metal, and includes a pair of opposite, upwardly sloping bottom surfaces 64 and 65, and opposite end walls 66 and 67. The tray 63 is readily removably supported on top of the housing 10 by means of a pair of brackets 68 and 69 engaged between the bottom surfaces 64 and 65 of tray 63 and the side walls 11 and 12 of housing 10 adjacent the opposite ends thereof, respectively. The tray 63 is filled with water W through a water supply pipe 70 from any suitable source.

In use, the housing 10 is positioned in an orchard, vineyard or the like adjacent crops to be kept warm, and the burner support bracket 21, having a burner 22 suitably secured thereto, as in FIG. 5, is supported on the side walls 11 and 12 by extending the legs 23 and 24 of the bracket through the openings 19 and 20 in the side walls. Fuel and air supply lines 39 and 40 are then connected with the serrated fittings 37 and 38, and suitable fuel and air control valves (not shown) are then manipulated to cause flow of fuel through the fuel supply line 39, pipe 33 and inlet fitting 54 to the area 45. The fuel is preferably supplied under a pressure of from 1 to 5 psi. Air is supplied through conduit 40, pipe 34 and inlet fitting 53 to slot 48 and is preferably supplied at a pressure of 20 to 50 psi. A hand-held torch, such as a propane torch or other suitable means, whether manual or automatic, is then disposed or directed toward the burner 22 to ignite the air-fuel mixture 49 and produce a flame F within the housing 10. The highly turbulent flame F produces a large amount of heat, which is radiated outwardly from the side walls 11 and 12 to the crops, thus keeping the crops warm.

Additionally, if desired, brackets 68 and 69 may be positioned on top of the housing 10 and the tray 63 supported on top of the brackets and water introduced through water supply line 70 to the tray, such that heat rising upwardly from the side walls and through the openings 18 heats the water in the tray, producing vapor or fog, which forms a blanket or thermal inversion layer to keep the heat near the ground and thus maintain the crops warm.

The modified vapor generator and reflector means 62', as in FIG. 2, is formed from a sheet of 16 gauge galvanized steel bent along the medial line thereof to form upwardly inclined, sloping bottom surfaces 64 and 65, and with the upper edges thereof rolled, as at 71 and 72, to reinforce the tray. The opposite end walls 66' and 67' are brazed or welded or otherwise suitably secured over the ends of the tray to hold the water W therein.

Figure 7:
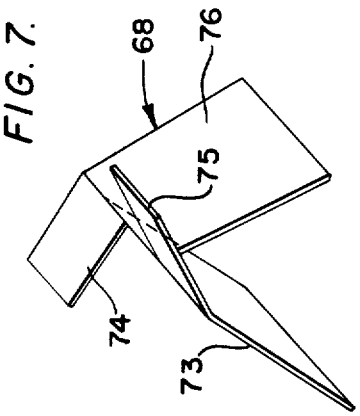
FIG. 7 is an enlarged perspective view of the vapor generator support bracket.

In a preferred construction, the housing 10 comprises a sheet of 28 to 32 gauge galvanized steel folded along a medial line thereof to form the oppositely sloping side walls 11 and 12, which subtend an angle of approximately 60 degrees. The tray 63 is also formed from a sheet of galvanized steel, preferably of about 26 gauge, and the opposite, upwardly sloping bottom surfaces thereof subtend an angle of about 120°. Similarly, the brackets 68 and 69 are substantially identical and are preferably formed from a sheet of 16 gauge galvanized steel, slit inwardly from opposite edges thereof to the medial line at a pair of spaced locations along the medial line, and thus defining a pair of unequal size, rectangular areas 73, 74 and 75, 76 on opposite sides of the medial line, with one area 74 and 75 on the respective sides being bent upwardly and the other areas 73 and 76 on the respective sides being bent downwardly, as seen best in FIG. 7.

Thus, a heater in accordance with the invention enables the number of heaters required to protect a certain area to be reduced by about 50 percent over prior art heaters, and the amount of fuel required is reduced by about 40 percent. Additionally, the heater of the present invention can be used with many different types of burners using various fuels, such as natural gas, propane, butane, heavy fuel oil or diesel or kerosene and the like. Accordingly, the present invention substantially reduces the cost of heaters to maintain crops warm by reducing the cost of labor required to install the heaters, and also by reducing the cost of fuel required to operate the heaters. The invention also provides flexibility in meeting future needs regarding availability of different fuels and different conditions and laws and the like.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A heater for warming crops such as fruit trees and vineyards and the like comprising an elongate housing having inclined side walls and opposite open ends; a burner means supported in the housing at one end thereof; air supply means and fuel supply means connected with the burner means to supply fuel and air thereto; said burner means having air and fuel outlet orifice means arranged to produce atomized fuel spray and obtain efficient and substantially pollution free combustion of the fuel and to produce a turbulent flame within the housing extending substantially the length of the housing; the angular disposition of said side walls being such that radiant heat is radiated in a generally horizontal direction onto the crops; and a vapor generator and heat reflector supported on top of said housing, said vapor generator and heat reflector comprising an elongate, shallow tray having opposite, upwardly and outwardly inclined bottom surfaces to reflect heat rising from the housing outwardly toward the crops, and water supply means to supply water to the tray whereby the upwardly rising heat heats the water and produces a quantity of vapor which forms a blanket of fog to retain the heat near the ground.

2. A heater as in claim 1, wherein the burner comprises a substantially frusto-conically shaped body having an upper end and a lower end, a fuel inlet fitting at the upper end and an air inlet fitting at the lower end, means on the outer surface of the body defining an area for flow of fuel downwardly over said area of said surface, said body having a slit therethrough at the bottom of said area, means establishing fluid communication between the fuel inlet fitting and the upper end of the area for effecting flow of fuel downwardly in a thin sheet over said area, and means establishing fluid communication between the air inlet and the slit for flow of air under pressure outwardly through said slit, to thus produce a turbulent, fine spray of fuel vapor and air which when ignited promotes thorough and substantially pollution-free combustion.

3. A heater as in claim 1, wherein the housing and tray comprise galvanized steel.

4. A heater as in claim 1, wherein the housing side walls are substantially rectangularly shaped with the long dimension thereof substantially horizontally disposed, said side walls converging together at their upper edges, a plurality of removable brackets supported on the convergent upper edges of the side walls, and said tray removably supported on said plurality of brackets.

5. A heater as in claim 4, wherein said housing and said tray each comprise a substantially rectangular sheet of galvanized steel bent along a respective medial line thereof to define said convergent side walls and said inclined bottom surfaces, respectively, and said bracket comprises a sheet of galvanized steel cut along a pair of spaced, parallel lines extending inwardly from the opposite side edges thereof to the medial line, defining a pair of adjacent, rectangularly shaped areas on each side of the medial line bent upwardly to engage a respective sloping bottom surface of the tray and the other area on each side of the medial line bent downwardly to engage a respective side wall of the housing, to thus removably support the tray on the housing.

6. A heater for warming crops such as fruit trees and vineyards and the like comprising: an elongate housing having inclined side walls and opposite open ends; a burner means supported in the housing at one end thereof for directing a flame longitudinally in said housing; air supply means and fuel supply means connected with the burner means to supply fuel and air thereto; said burner means having a substantially frusto-conically shaped body having an upper end, a lower end, and a side means connecting said upper end to said lower end and a bottom edge defined at the intersection of said side means and said lower end, a fuel inlet fitting at the upper end and an air inlet fitting at the lower end, upstanding guide ribs extending along said body on the outer surface of said side means defining a fuel flow area for guiding fuel downwardly on said side means, said side means having an arcuate air outlet slit defined therein adjacent said bottom edge, said air outlet slit extending across said flow area so that fuel flowing in said flow area flows over said air outlet slit, means establishing fluid communication between the fuel inlet fitting and the upper end of the flow area for effecting flow of fuel downwardly in a thin sheet of fuel in said flow area, and means establishing fluid communication between the air inlet fitting and the air outlet slit for directing pressurized air to said air outlet slit, said air outlet slit directing said pressurized air outwardly from said side means through said fuel flowing in said fuel flow area to thus produce a turbulent, fine spray of fuel vapor and air emanating from a location immediately in front of said air outlet slit which spray when ignited produces a flame directed outwardly from and based at said outlet slit and which is substantially pollution free.

7. The heater of claim 6 wherein said air outlet slit is located in said bottom edge and adjoining said side means and said lower end.

8. A heater as in claim 6, wherein a burner support bracket is removably supported on said one end of the housing, said burner support bracket comprising a substantially vertically disposed plate and a pair of substantially vertically extending, spaced apart legs, means supporting the plate on the legs in spanning relationship thereto, said plate having a pair of spaced apart openings therethrough, an air supply pipe extended through and secured in one of said openings and a fuel supply pipe extended through and secured in the other of said openings, and supply pipes secured to the air and fuel inlets, respectively, on the burner and supporting the burner in the housing, and further wherein said flame extends substantially the entire length of said housing.

* * * * *